United States Patent [19]

Mochizuki

[11] Patent Number: 5,315,899
[45] Date of Patent: May 31, 1994

[54] HYDRAULIC CONTROL SYSTEM FOR AUTOMATIC TRANSMISSION OF AUTOMOTIVE VEHICLE WITH EXHAUST BRAKING SYSTEM USING VEHICLE PAYLOAD SENSING MEANS

[75] Inventor: Hideki Mochizuki, Shizuoka, Japan
[73] Assignee: Jatco Corporation, Fuji City, Japan
[21] Appl. No.: 973,685
[22] Filed: Nov. 9, 1992
[51] Int. Cl.$^5$ .......................................... B60K 41/20
[52] U.S. Cl. ................................. 477/119; 123/323; 364/426.04; 477/186; 477/901; 477/902
[58] Field of Search ................................ 123/321–323; 364/424.1, 426.04; 74/867; 192/1.23

[56] References Cited

U.S. PATENT DOCUMENTS

| | | | |
|---|---|---|---|
| 4,488,456 | 12/1984 | Taga et al. | 74/867 X |
| 4,534,244 | 8/1985 | Hiramatsu | 74/867 X |
| 4,563,918 | 1/1986 | Sugano | 74/867 X |
| 4,658,676 | 4/1987 | Furusawa et al. | 364/424.1 X |
| 4,765,201 | 8/1988 | Ishiguro et al. | 192/1.23 X |
| 5,107,725 | 4/1992 | Takahashi | 74/867 |
| 5,121,723 | 6/1992 | Stepper et al. | 123/322 |
| 5,193,657 | 3/1993 | Iizuka | 123/323 X |

FOREIGN PATENT DOCUMENTS

62-61843 3/1987 Japan.

Primary Examiner—Leslie A. Braun
Assistant Examiner—Khoi Ta
Attorney, Agent, or Firm—Foley & Lardner

[57] ABSTRACT

A hydraulic control system for an automatic transmission of an automotive vehicle with an exhaust braking unit is provided. This hydraulic control system serves to elevate hydraulic pressure utilized for actuating frictional elements of the automatic transmission during exhaust braking operation toward a preselected level when the pay load of the vehicle is greater than a preselected threshold value for securing tight engagement of the frictional elements without any slippage.

8 Claims, 8 Drawing Sheets

FIG.5

HYDRAULIC CONTROL SYSTEM FOR AUTOMATIC TRANSMISSION OF AUTOMOTIVE VEHICLE WITH EXHAUST BRAKING SYSTEM USING VEHICLE PAYLOAD SENSING MEANS

BACKGROUND OF THE INVENTION

1. Field of the Invention

The present invention relates generally to a hydraulic control system for an automatic transmission of an automotive vehicle. More particularly, the invention is directed to a hydraulic control system which serves to adjust a level of fluid pressure to actuate frictional elements of an automatic transmission during exhaust braking operation for securing tight engagement of the frictional elements.

2. Description of The Prior Art

It is current practice to increase engine braking effects by using a control valve which closes an engine exhaust passage to restrict exhaust gas flow, causing internal resistance of the engine against engine rotation to increase. Additionally, for automatically changing gear, an automatic transmission utilizes a power train including gears and frictional elements such as clutches and brakes. When changing gear, the preselected frictional elements are engaged or disengaged by hydraulic pressure. The hydraulic pressure for controlling the frictional elements is generally provided with fluid pressure produced by an oil pump which is in turn modified to line pressure through a primary regulator valve according to vehicle speed or a throttle valve opening angle.

During exhaust braking operation, a relatively great driving force is transmitted to the automatic transmission from road wheels which may rotate the engine in a reverse direction with the result that the hydraulic pressure for changing gear becomes insufficient for securing tight engagement of the frictional elements, causing the frictional elements to slip undesirably. This results in the durability of the frictional elements being degraded.

For avoiding the above drawback, Japanese Patent First Publication No. 62-61843 proposes a hydraulic control system for an automatic transmission which elevates hydraulic pressure for actuating frictional elements by a certain degree during exhaust braking operation.

However, the above prior art hydraulic control system for an automatic transmission is adapted for increasing a hydraulic pressure level uniformly when changing a gear ratio regardless of the pay load of the vehicle. Therefore, while the durability of the frictional elements may be improved, the hydraulic pressure tends to be higher than necessary for actuating the frictional elements when the vehicle is traveling with a relatively light load, causing large scale shock to occur upon engagement of the frictional elements. This gives an unpleasant feeling to vehicle passengers.

SUMMARY OF THE INVENTION

It is therefore a principal object of the present invention to avoid the disadvantages of the prior art.

It is another object of the present invention to provide a hydraulic control system for an automatic transmission with an exhaust braking system which serves to elevate a hydraulic pressure level for actuating frictional elements of the transmission during exhaust braking operation so that tight engagement of the frictional elements is established without any slippage thereof.

According to one aspect of the present invention, there is provided a hydraulic control system for an automatic transmission with an exhaust braking unit which comprises a pressure controlling means for controlling fluid pressure which serves to actuate frictional elements of the automatic transmission, an exhaust braking operation detecting means for detecting exhaust braking operation to provide a signal indicative thereof, a vehicle load determining means for determining load of the vehicle to provide a signal indicative thereof, and a controlling means responsive to the signals from the exhaust braking operation detecting means and the vehicle load determining means for providing a control signal to the pressure controlling means so that the fluid pressure for actuating the frictional elements is elevated to a preselected level during exhaust braking operation when an amount of the load of the vehicle is greater than a preselected value.

In the preferred mode, the vehicle load determining means may includes a displacement sensor for detecting a relative displacement of a vehicle body and an axle to determine the load of the vehicle. Alternatively, the vehicle load determining means may be adapted for determining the load of the vehicle based on a degree of slippage of a torque converter of the automatic transmission.

BRIEF DESCRIPTION OF THE DRAWINGS

The present invention will be understood from the detailed description given hereinbelow and from the accompanying drawings of the preferred embodiments which are given for explanation and understanding only and are not intend to imply limitation to the invention.

In the drawings.

DESCRIPTION OF THE PREFERRED EMBODIMENT

Figure 1:
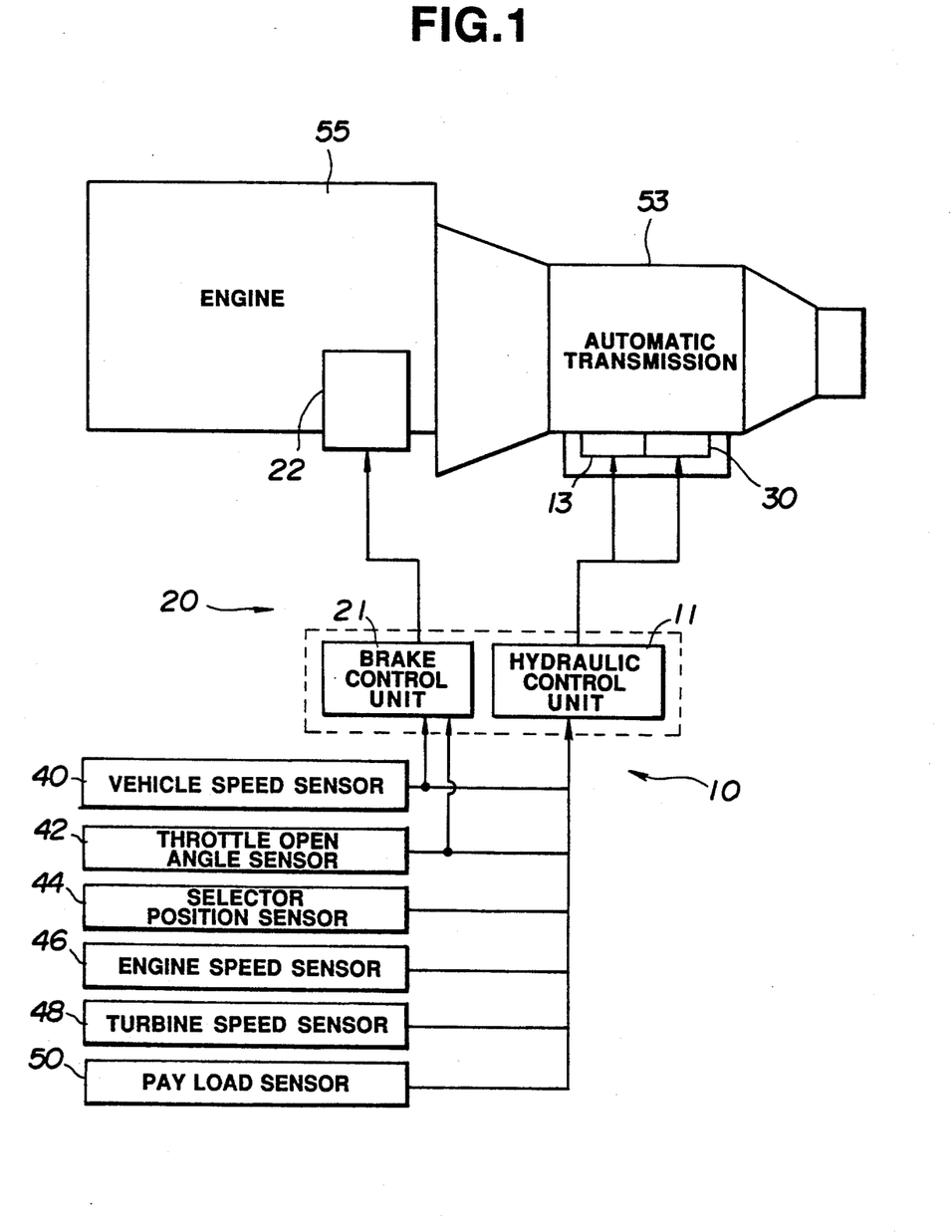
FIG. 1 is a block diagram which shows a hydraulic control system for an automatic transmission with an exhaust braking control system according to the present invention.
Figure 2:
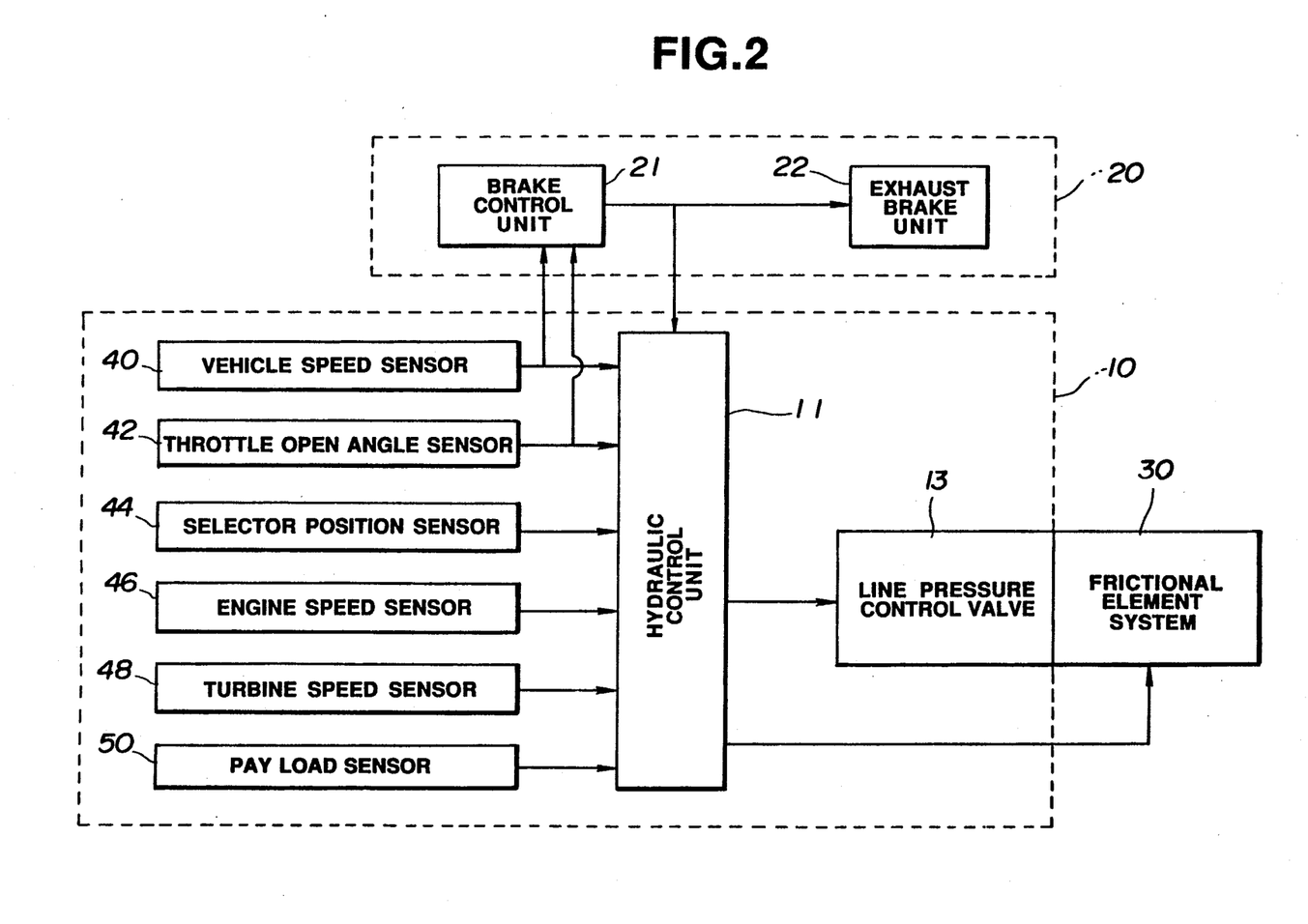
FIG. 2 is a circuit diagram which shows a hydraulic control system for an automatic transmission and an exhaust braking control system.

Referring now to the drawings, particularly to FIGS. 1 and 2, a hydraulic control system 10 for an automatic transmission 53 and an exhaust braking control system 20 are shown.

The automatic transmission hydraulic control system 10 includes generally a hydraulic control unit 11 including a microcomputer, a line pressure control valve 13, a vehicle speed sensor 40, a throttle valve opening angle sensor 42 for detecting an opening angle of a throttle valve, a selector lever position sensor 44, an engine speed sensor 46, a turbine speed sensor 48 for detecting speed of a turbine runner of a torque converter (not shown) in the transmission 53, and a pay load sensor 50 for detecting the weights of baggage and vehicle passengers. These sensors provide sensor signals indicating detected parameters to the hydraulic control unit 11. The hydraulic control unit 11 are then responsive to the sensor signals to provide control signals to a frictional element system 30 of the automatic transmission 53 so that a preselected gear ratio is established according to a given gear shifting schedule.

Figure 2A:
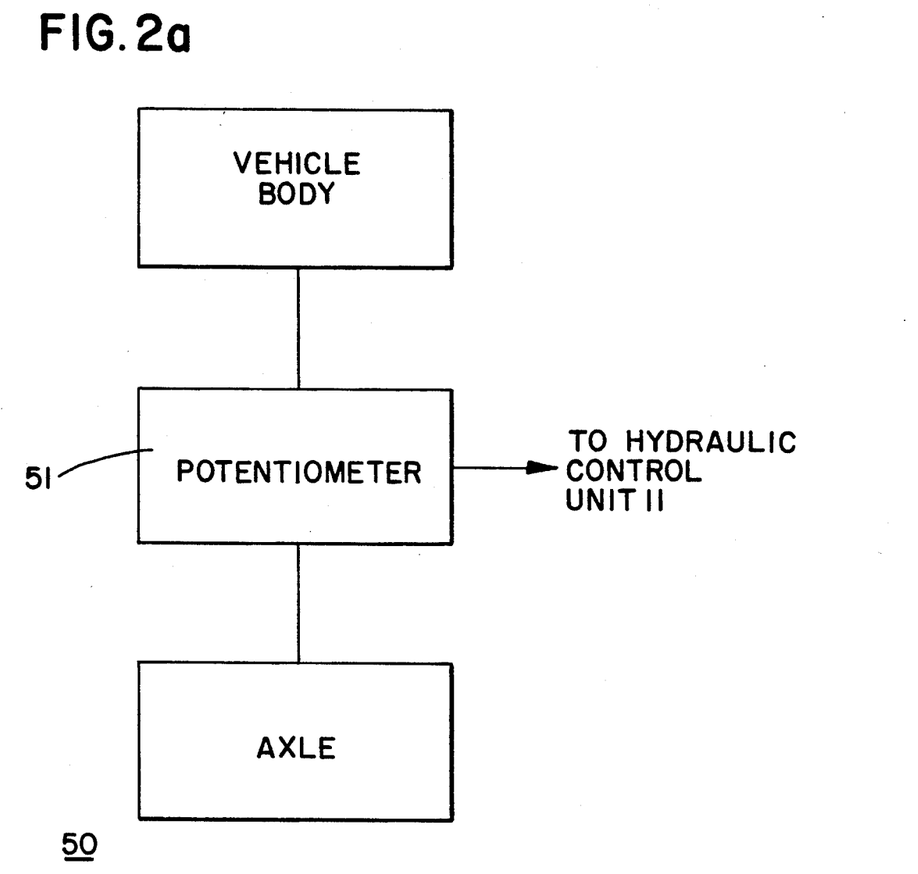
FIG. 2a is a block diagram showing a potentiometer which serves as the payload sensor according to one embodiment of the invention.

The pay load sensor 50 includes a potentiometer 51 disposed between a vehicle body and an axle which detects a relative displacement between the vehicle body and the axle dependent upon an amount of pay load of the vehicle and then converts it into an electrical resistance signal. During exhaust braking operation, the hydraulic control unit 11 is responsive to the signal from the pay load sensor 50 to provide a control signal to the line pressure control valve 13 so that suitable line pressure is established according to an amount of pay load of the vehicle for securing tight engagement of frictional elements of the frictional element system 30 such as clutches and brakes.

Figure 2B:
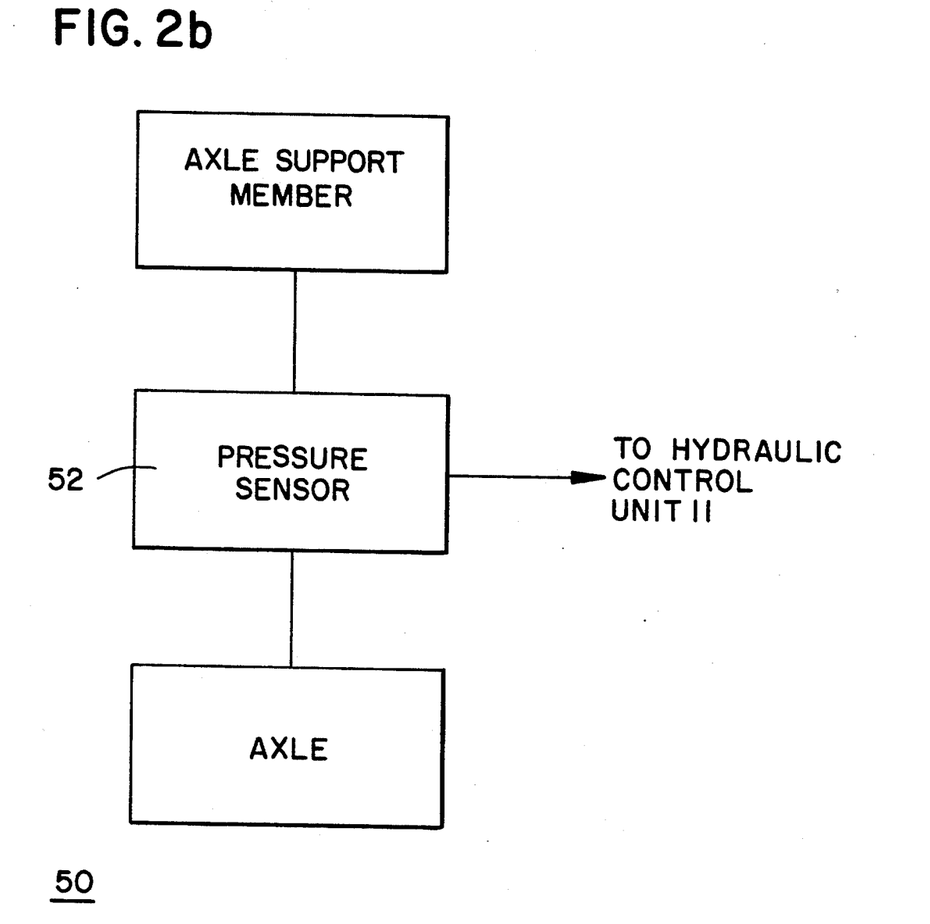
FIG. 2b is a block diagram showing a pressure sensor which serves as the payload sensor according to another embodiment of the present invention.
Figure 2C:
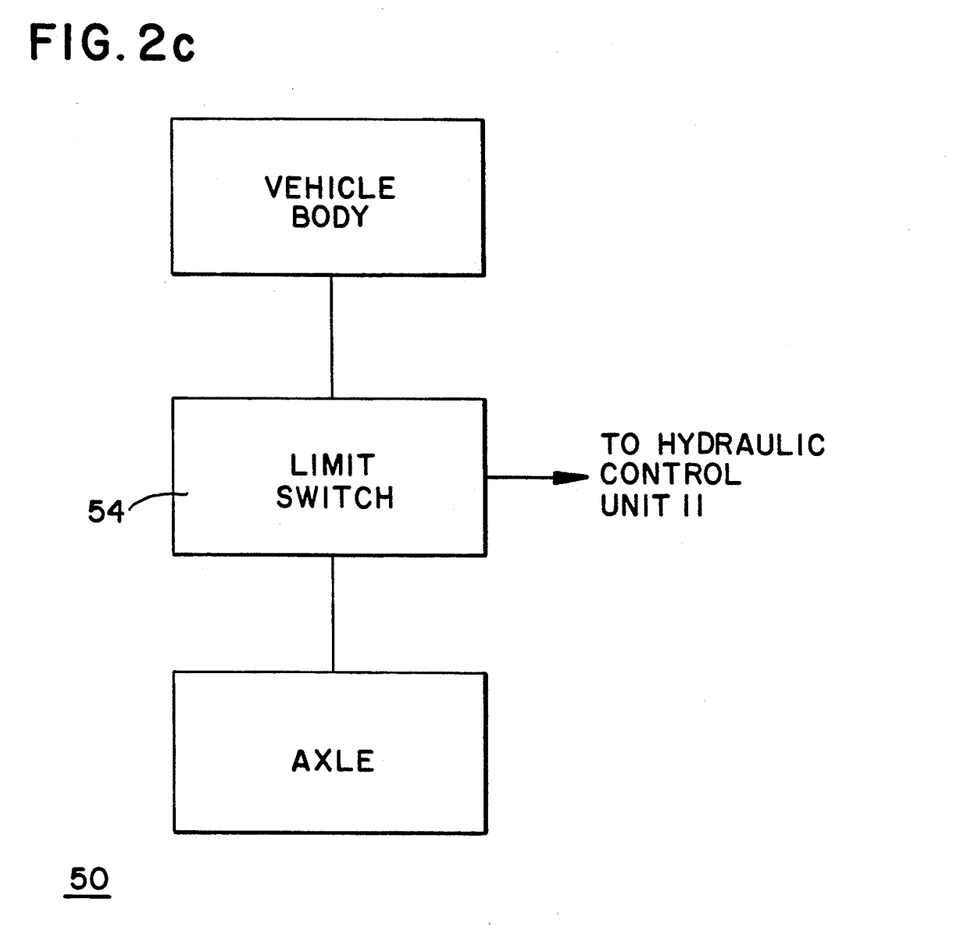
FIG. 2c shows a limit switch which serves as the payload sensor according to another embodiment of the present invention.

The pay load sensor 50 may alternatively be provided with a pressure sensor 52 which is arranged on a support member of an axle for measuring variation in vehicle load caused by passengers getting in or out of a vehicle and/or baggage loaded into or unloaded from a baggage compartment. Further, the pay load sensor 50 may be replaced with a limit switch 54 which is operable to actuate in response to a preselected variation in relative displacement between the vehicle body and the axle.

The exhaust braking control system 20 includes a brake control unit 21 and an exhaust brake unit 22. The brake control unit 21 is responsive to the sensor signals from the vehicle speed sensor 41 and the throttle valve opening angle sensor 42 to provide a control signal to the exhaust brake unit 22 for providing engine braking effects.

Figure 3:
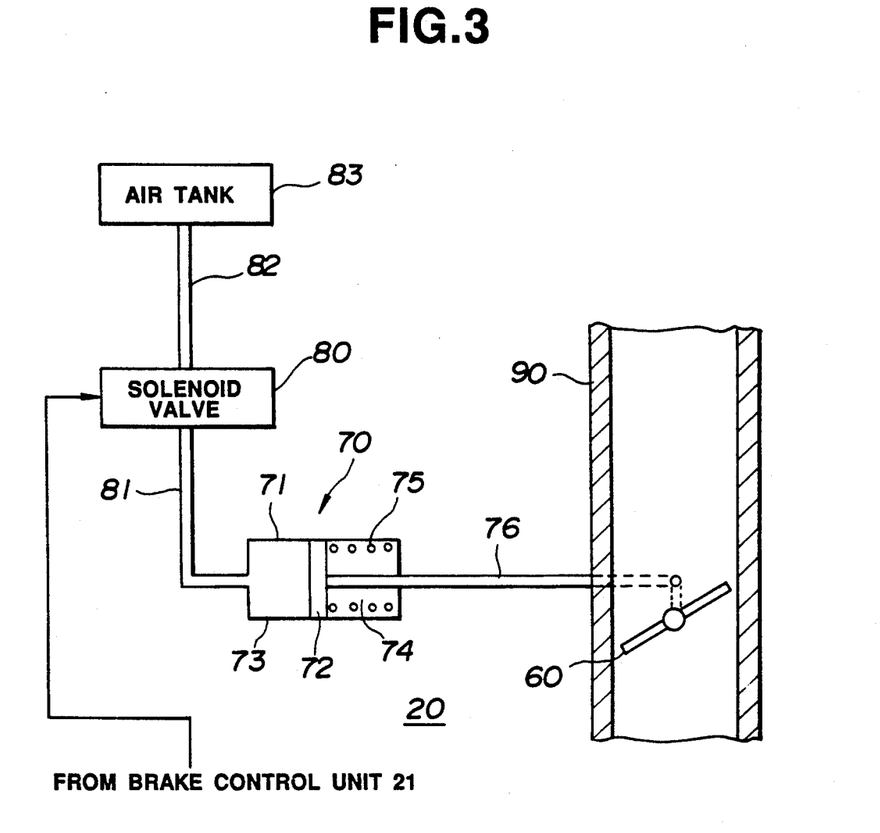
FIG. 3 is a schematic view which shows an exhaust braking control system.

Referring to FIG. 3, there is shown a schematic diagram of the exhaust brake unit 22. The exhaust brake unit 22 includes a butterfly valve 60 situated within an engine exhaust passage 90 between a fully-open position and a fully-closed position for controlling an amount of exhaust gas discharged from an engine 55 to the atmosphere. Normally, the butterfly valve is in its fully-open position to allow free flow of exhaust gas through the exhaust passage 90. In the fully-closed position of the butterfly valve 60, the engine operates like a compressor and exhaust braking effects appear. The exhaust braking effects decrease as the butterfly valve 60 rotates in an opening direction from the fully-closed position. The butterfly valve 60 is connected by a mechanical linkage to a valve actuator 70.

The valve actuator 70 includes a housing 71 and a piston 72 supported for sliding movement within the housing between a retracted position and an advanced position. The piston 72 defines first and second chambers 73 and 74 on the opposite sides thereof. The first chamber 73 is connected by a conduit 81 to a solenoid valve 80 which in turn is connected by a conduit 82 to an air tank 83. The air tank 83, which is connected to an air pump (not shown) and also to a pressure regulator (not shown), introduces a constant level of air pressure through the solenoid valve 80 into the first chamber 73 to move the piston 72 toward its advanced position. A compression spring 75 is placed in the second chamber 74 to bias the piston 72 toward its retracted position. The piston 72 has an operation rod 76 secured at its one end for movement in unison therewith. The operation rod 76 is connected at the other end thereof to rotate the butterfly valve 60 within the exhaust passage 90. In the retracted position of the piston 72, the butterfly valve 60 fully opens the exhaust passage 90, and in the advanced position of the piston 72, the butterfly valve 60 fully closes the exhaust passage 90. The solenoid valve 80 operates in an on/off fashion on an electrical pulse signal fed thereto from the brake control unit 21 to adjust the air pressure charged in the second chamber 73 of the valve actuator 70.

In operation, for example, when an accelerator pedal is released to close a throttle valve completely during high speed traveling, the brake control unit 21 outputs a preselected pulse signal to close the butterfly valve 60 for providing exhaust braking effects. The brake control unit 21 also provide a signal to the hydraulic control unit 11 which indicates operational conditions of the exhaust braking.

Figure 4:
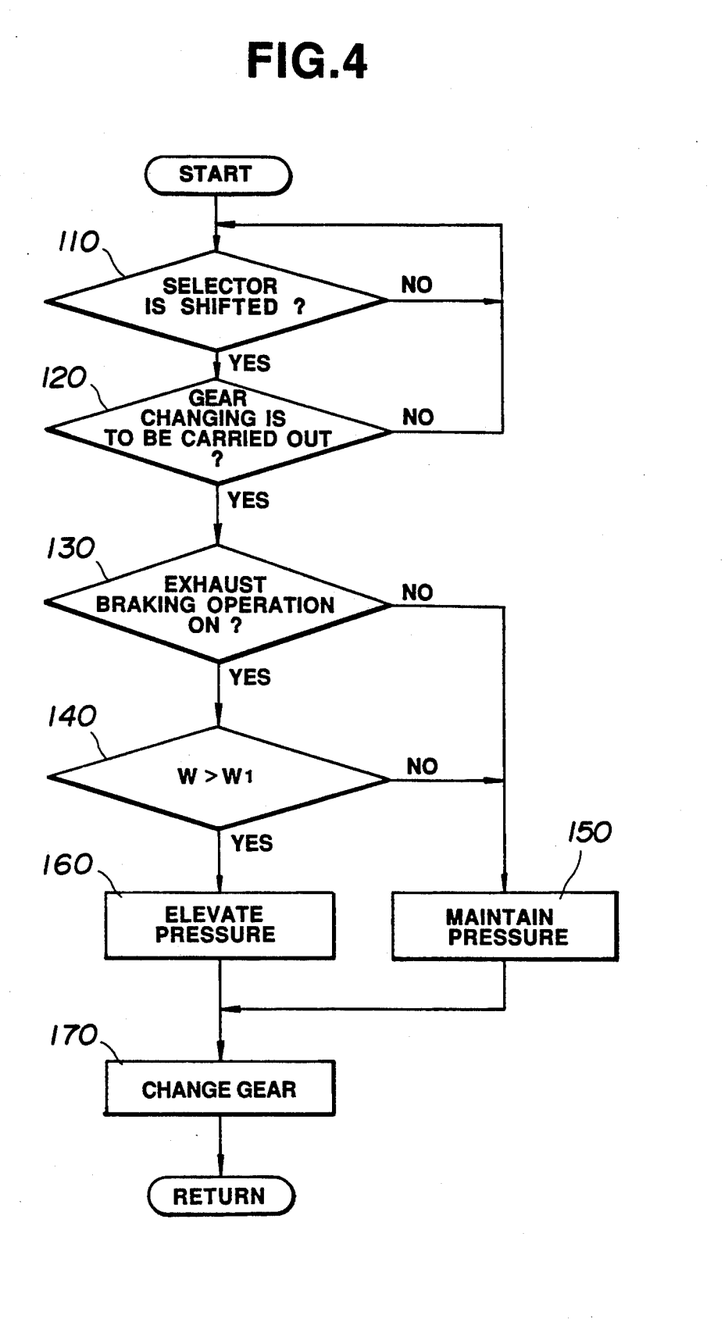
FIG. 4 is a flowchart which shows logical steps performed by a hydraulic control unit for an automatic transmission according to the invention.

Referring to FIG. 4, there is shown a flowchart of a program or sequence of logical steps performed by the hydraulic control unit 11.

After entering the program, the routine proceeds to step 110 wherein it is determined whether or not a selector lever of the automatic transmission is shifted to another position which provides a lower-speed gear ratio based on a sensor signal from the selector lever position sensor 44. If a YES answer is obtained, the routine then proceeds to step 120 wherein it is determined whether a driver depresses an accelerator pedal or not based on a sensor signal from the throttle valve opening angle sensor 42 for determining whether the gear shifting operation is to be performed or not. For example, when a vehicle is traveling at a relatively low speed, even if the selector lever is shifted to another position of the lower-speed gear ratio, the gear shifting operation is not carried out. During traveling at a high speed, when the selector lever is shifted to the position for the lower-speed gear ratio with the accelerator pedal being released, the system considers that the driver requires engine braking effects.

If a YES answer is obtained in step 120, the routine proceeds to step 130 wherein it is determined whether or not the brake control unit 21 outputs a control signal for actuating the exhaust brake unit 22. If a NO answer is obtained concluding that the exhaust brake unit 22 is not to be operated and thus increasing a pressure level of working fluid for actuating the frictional elements of the automatic transmission 53 is not necessary, the routine then proceeds to step 150 wherein a normal pressure level of the working fluid is maintained as is.

If a YES answer is obtained in step 130, the routine then proceeds to step 140 wherein it is determined whether an amount of pay load of the vehicle W detected by the pay load sensor 50 is greater than a preselected threshold value W1 or not. If a YES answer is obtained, the routine then proceeds to step 160 wherein a control signal is output to the line pressure control valve 13 so that line pressure is increased to a level required for establishing tight engagement of the frictional elements without any slippage. Afterward, the routine proceeds to step 170 wherein a gear ratio is changed in a conventional manner.

With the above mentioned line pressure regulation, when the exhaust braking control system 20 is actuated while a vehicle travels with a relatively great pay load, hydraulic pressure utilized for actuating the frictional elements of the automatic transmission is elevated toward a preselected level which serves to establish complete engagement of the frictional elements of the automatic transmission without any slippage. Thus, the durability of the frictional elements of the automatic transmission is secured. On the other hand, when a vehicle is traveling with a relatively light load, the normal line pressure level is maintained even when the exhaust braking control system 20 is operated. Therefore, uncomfortable shock which tends to be generated when changing gear during exhaust braking operation due to excess line pressure elevation is prevented from occurring.

Figure 5:
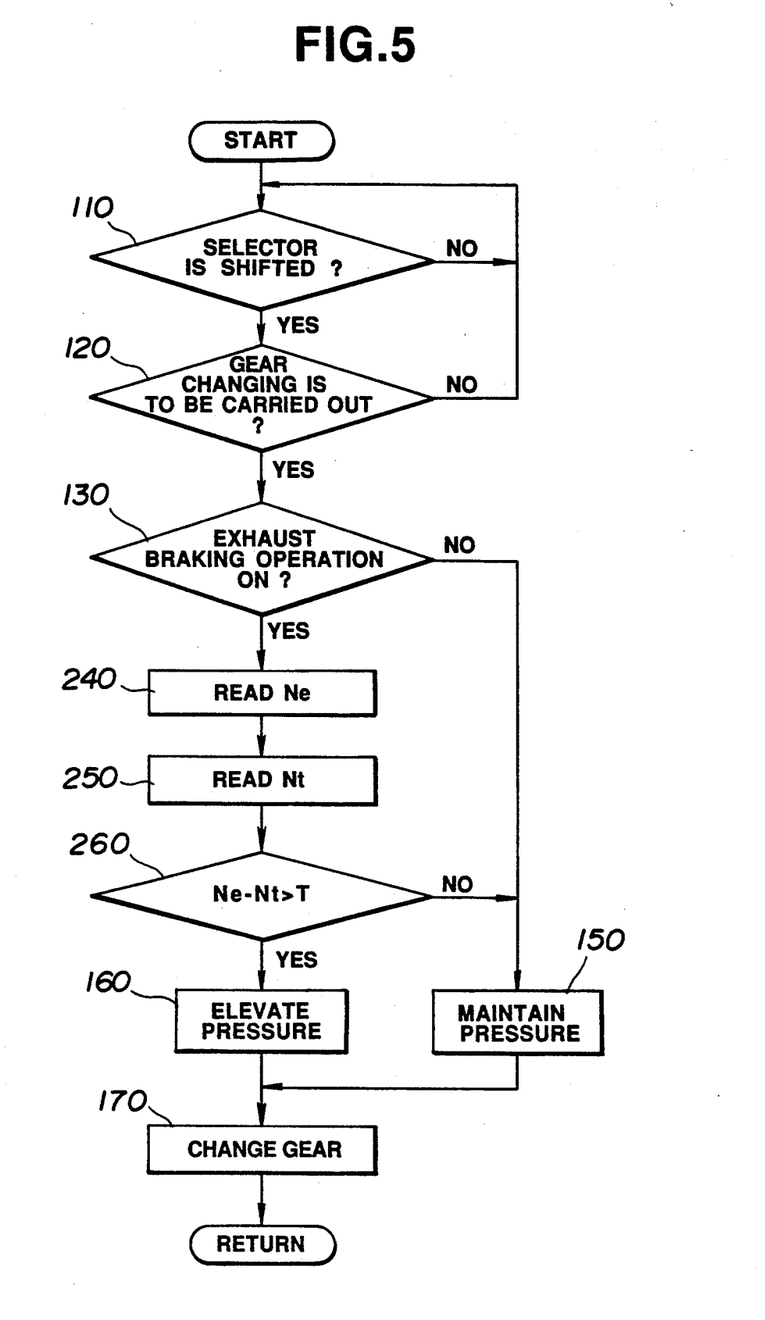
FIG. 5 is a flowchart which shows an alternative logical steps performed by a hydraulic control unit for an automatic transmission of the invention.

Referring to FIG. 5, there is shown a flowchart of an alternative program performed by the hydraulic control unit 11 utilizing input parameters normally used for automatic transmission control. The shown flowchart is different from the above mentioned first embodiment in steps 240, 250, and 260 only and thus explanation in detail of the other steps will be omitted here.

If a YES answer is obtained in step 130 concluding that a control signal is output to the exhaust brake unit 22 for actuating it, the routine then proceeds to step 240 wherein the vehicle speed Ne detected by the vehicle speed sensor 40 is read in the hydraulic control unit 11. Likewise, in step 250, the turbine speed Ne of the torque converter detected by the turbine speed sensor 48 is read in the hydraulic control unit 11.

Afterward, the routine proceeds to step 260 wherein it is determined whether a difference between the vehicle speed Ne and the turbine speed Nt is greater than a preselected threshold value T or not (Ne−Nt>T?). It will be noted that the engine speed is an input to the torque converter and thus the difference between the vehicle speed Ne and the turbine speed Nt represents a degree of slippage between input and output shafts of the torque converter. This slippage is increased as the pay load of the vehicle is increased. Therefore, if a YES answer is obtained in step 260 concluding that the pay load is greater than a preselected threshold value (equal to a threshold value in step 140 of FIG. 4), the routine then proceeds to step 160 wherein a control signal is output to the line pressure control valve 13 so that line pressure is increased to a level sufficient for establishing complete engagement of the frictional elements without any slippage.

If a NO answer is obtained in step 260, the routine then proceeds to step 150 wherein a normal line pressure level is maintained as is.

With the above arrangement, an amount of pay load may be determined based on control parameters for the automatic transmission, therefore, a pay load sensor is not needed.

Additionally, a plurality of threshold values may be provided in steps 140 or 260 so that a line pressure level is elevated in a stepwise fashion or roughly in a linear fashion according to the magnitude of pay load of the vehicle.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims. For example, according to fuzzy logic as employed in the invention, calculation may be effected utilizing parameters indicative of vehicle acceleration, engine torque, and braking operations of road wheels as well as vehicle speed, engine speed, and throttle valve opening angle to determine a level of pressure for establishing engagement of frictional elements of the automatic transmission sufficient for loads acting on the frictional elements during exhaust braking operation.

What is claimed is:

1. A hydraulic control system for an automatic transmission of an automotive vehicle with an exhaust braking unit comprising:

pressure controlling means for controlling fluid pressure which serves to actuate frictional elements of the automatic transmission;

exhaust braking operation detecting means for detecting exhaust braking operation to provide a signal indicative thereof;

vehicle load determining means for determining load of the vehicle to provide a signal indicative thereof; and controlling means responsive to the signals from said exhaust braking operation detecting means and said vehicle load determining means for providing a control signal to said pressure controlling means so that the fluid pressure for actuating said frictional elements is elevated to a preselected level during exhaust braking operation when an amount of the load of the vehicle is greater than a preselected value.

2. A hydraulic control system as set forth in claim 1, wherein said vehicle load determining means includes sensing means for detecting a relative displacement of a vehicle body and an axle to determine the load of the vehicle.

3. A hydraulic control system for an automatic transmission of an automotive vehicle with an exhaust braking unit comprising:

pressure controlling means for controlling fluid pressure which serves to actuate frictional elements of the automatic transmission;

exhaust braking operation detecting means for detecting exhaust braking operation to provide a signal indicative thereof;

vehicle load determining means for determining load of the vehicle to provide a signal indicative thereof; and controlling means responsive to the signals from said exhaust braking operation detecting means and said vehicle load determining means for providing a control signal to said pressure controlling means so that the fluid pressure for actuating said frictional elements is elevated to a preselected level during exhaust braking operation when an amount of the load of the vehicle is greater than a preselected value;

wherein said vehicle load determining means is adapted for determining the load of the vehicle based on a degree of slippage of a torque converter of the automatic transmission.

4. A hydraulic control system as set forth in claim 1, wherein said pressure control means is provided with a line control pressure valve which serves to control line pressure used for actuating the frictional elements.

5. A hydraulic control system as set forth in claim 1, wherein the fluid pressure for actuating said frictional elements is elevated to the preselected level required for establishing tight engagement of the frictional elements without any slippage during the exhaust braking operation.

6. A hydraulic control system as set forth in claim 2, wherein said sensing means comprises a potentiometer disposed between a vehicle body and an axle so as to respond to changes in the relative displacement between said vehicle body and said axle.

7. A hydraulic control system as set forth in claim 1, wherein said vehicle load determining means includes a pressure sensor which is arranged on a support member of an axle for measuring variations in vehicle load.

8. A hydraulic control system as set forth in claim 2, wherein said sensing means comprises a limit switch disposed between a vehicle body and an axle so as to actuate in response to a preselected variation in relative displacement between said vehicle body and said axle.

* * * * *